Figure 1:
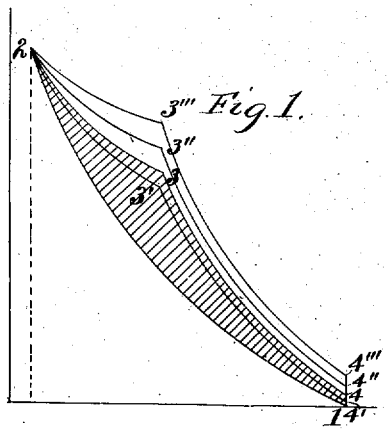

No. 11,900. Reissued Apr. 2, 1901.

R. DIESEL.

INTERNAL COMBUSTION ENGINE.

(Application filed July 3, 1900.)

2 Sheets—Sheet 1.

Witnesses.
Oscar W. Jeffery
Theodore T. Dorman

Inventor.
Rudolf Diesel
by Wetmore & Jenner
Attys

No. 11,900. Reissued Apr. 2, 1901.
R. DIESEL.
INTERNAL COMBUSTION ENGINE.
(Application filed July 3, 1900.)
2 Sheets—Sheet 2.
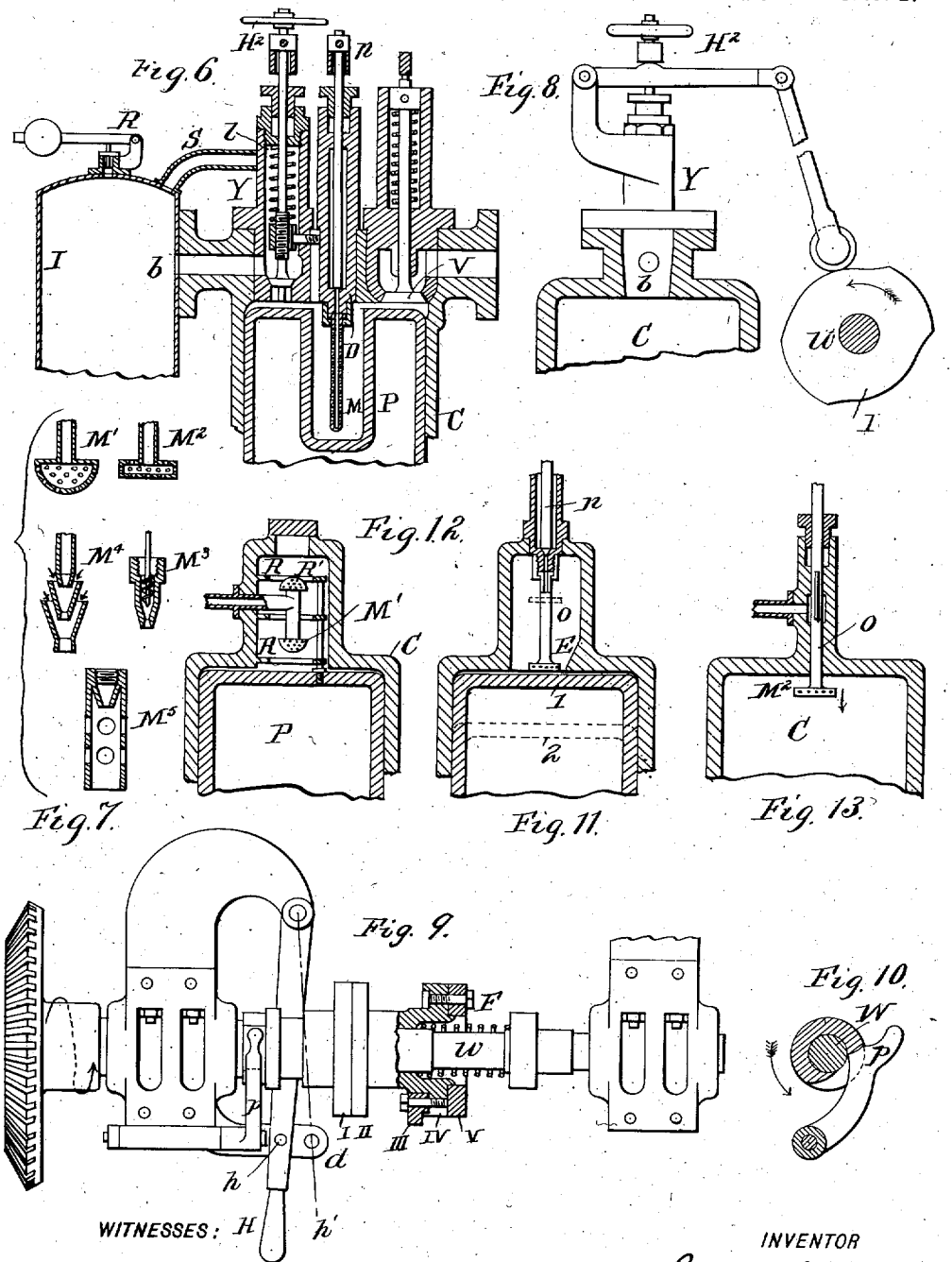
WITNESSES: Oscar W. Jeffery, Theodore T. Dorman
INVENTOR Rudolf Diesel
BY Wilmer Duner
ATTORNEYS

UNITED STATES PATENT OFFICE.

RUDOLF DIESEL, OF MUNICH, GERMANY, ASSIGNOR, BY MESNE ASSIGNMENTS, TO THE DIESEL MOTOR COMPANY OF AMERICA.

INTERNAL-COMBUSTION ENGINE.

SPECIFICATION forming part of Reissued Letters Patent No. 11,900, dated April 2, 1901.

Original No. 608,845, dated August 9, 1898. Application for reissue filed July 3, 1900. Serial No. 22,462.

*To all whom it may concern:*

Be it known that I, RUDOLF DIESEL, a subject of the King of Bavaria, and a resident of Munich, in the Kingdom of Bavaria, Germany, have invented certain new and useful Improvements in Internal-Combustion Engines, (for which I have obtained Letters Patent in Germany, No. 86,633, dated March 30, 1895; in France, No. 243,531, dated December 10, 1894, and patent of addition to the same, dated March 1, 1895; in Belgium, No. 113,139, dated December 10, 1894, and Patent of Addition No. 114,346, dated February 18, 1895; in England, No. 4,243, dated February 27, 1895; in Switzerland, Nos. 10,134 and 10,135, dated March 5, 1895; in Luxemburg, No. 2,192, dated December 10, 1894, and Patent of Addition No. 2,265, dated March 22, 1895; in Denmark, No. 393, dated February 12, 1896; in Austria, No. 46/203, dated January 18, 1896, and No. 46/2,038, dated May 22, 1896; in Hungary, No. 4,539, dated November 23, 1895, and No. 7,876, dated March 20, 1897; in Italy, LXXV, 132, dated February 21, 1895, and in Spain, No. 16,654, dated December 3, 1894, and Patent of Addition No. 17,085, dated March 4, 1895,) of which the following is a specification.

My invention has reference to improvements in apparatus for regulating the fuel-supply in slow-combustion motors, and in particular to internal-combustion engines adapted for carrying out the process described in my prior patent, No. 542,846, dated July 16, 1895, which process consists in first compressing air or a mixture of air and neutral gas or vapor to a degree producing a temperature above the igniting-point of the fuel to be consumed, then gradually introducing the fuel for combustion into the compressed air while expanding against resistance sufficiently to prevent an essential increase of temperature and pressure, then discontinuing the supply of fuel and further expanding without transfer of heat.

In ordinary combustion-engines the regulation of work done was performed either while the gas was at a constant pressure or, as in explosive-engines, with the gas at constant volume.

My invention further relates to a system of compressed-air-supply valves and fuel-supply valves and their operating mechanisms and means for placing either into operative connection with the engine, whereby the compressed air is used to start the engine on a two-stroke cycle, and then without interrupting the movement of the engine it is made to operate on a four-stroke cycle in connection with the fuel-supply.

The nature of my invention will be best understood when described in connection with the accompanying drawings, in which—

Figure 2:
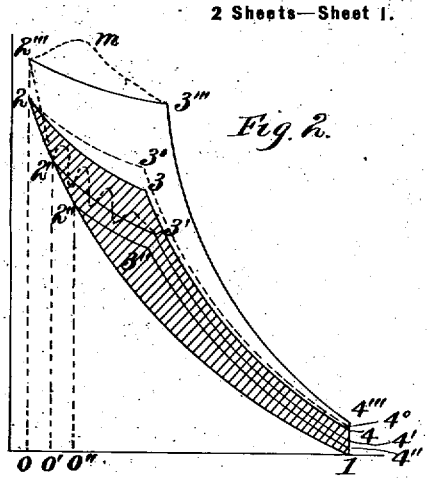
Figure 3:
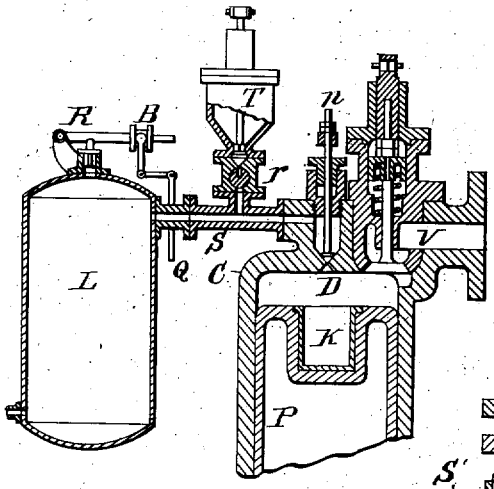
Figure 5:
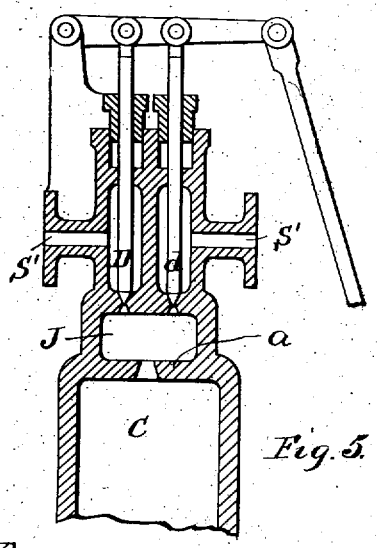
Figure 4:
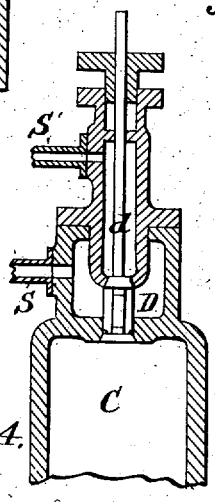

Figures 1 and 2 are diagrams illustrating the cycle of operation. Fig. 3 is a vertical section of an engine, illustrating one form of fuel-feed, part being broken away. Figs. 4 and 5 are similar views illustrating modified forms for the feed. Fig. 6 is a sectional elevation illustrating another modified form for the same. Fig. 7 shows sectional views of detail parts. Figs. 8, 9, and 10 illustrate in sectional elevation the arrangement of the mechanism for operating the valve. Figs. 11, 12, and 13 are sectional elevations illustrating different devices for mixing the air and fuel.

Similar letters and figures of reference designate corresponding parts throughout the several views of the drawings.

Referring now to Fig. 1 of the drawings, which illustrates a theoretical indicator-diagram of the engine, the curve 2 3 corresponds to the period of admission and consumption of fuel, the fuel being injected under a pressure greater than the pressure 0 2 at the point of highest compression.

By varying the excess of pressure under which fuel is injected and in the meantime the length or duration of admission of fuel the cumbustion-curve 2 3, Fig. 1, is changed both in its form or position, as in its length 2 3′ 2 3², &c., thus producing diagrams such as 1 2 3 4 or 1 2 3′ 4′, &c. In all the diagrams shown in Fig. 1 the fuel is admitted at the point 2 of highest compression. In Fig. 2 the beginning of admission is variable, as will be hereinafter explained.

Referring now to Fig. 3 for a description of an apparatus for carrying out the regulation of the supply of fuel, the letter C designates a cylinder provided with a piston P and with an air-valve V. D is a nozzle for regulating the supply of fuel, by means of which the periods of admission and cut-off, and consequently the length of the curve 2 3 or 2 3′, &c., are determined with the use of a needle-valve *n*, actuated by any well-known mechanism. Pulverulent solid fuel is contained in a hopper T, provided with a rotary distributing-valve *r*. L is a reservoir which is supplied with compressed gas through a pipe *m*. The gas may be air, a combustible gas, or a mixture of combustible gas and air. The air or gas or the mixture of the same is held under a pressure (by means of a pump or other well-known means) in excess of the highest pressure in the cylinder C. Said reservoir L is connected with the cylinder C by a pipe S and with the hopper T by a suitable branch pipe in communication with the pipe S.

When the valve *n* is lifted to open the nozzle D, the excess of pressure in the reservoir L causes the gas to flow through the pipe S and the nozzle D into the cylinder C, carrying with it the pulverulent fuel discharged by the turning of the valve *r*. In this manner an intimate mixture of gas and fuel is obtained and injected into the cylinder and rapid and complete combustion is insured.

If the pressure in the reservoir L were fixed and constant, the same combustion-curve 2 3 would always result for a predetermined and fixed admission and cut-off and a predetermined or fixed highest compression in the cylinder C; but if under these conditions of admission and cut-off the curve of combustion is to be altered or varied then the pressure in the reservoir L must be changed. This change is effected by means of the pressure-regulating valve R, Fig. 3, the weight B of which can be shifted by means of the rod Q, suitably connected with the governor of the engine. (Not shown.) By the coöperation of the needle-valve *n*, which regulates fuel admission and cut-off and the adjustable excess of gas-pressure, the form of the working diagram is determined. In other words, both variations conjointly produce the variable form of the combustion-curve, distinctly marking the new method of regulating. Both can be effected by the governor or one by the governor and the other by hand, according to the degree of sensitiveness required. The valve for regulating the pressure in the reservoir L may of course be of any other construction which will answer the purpose and may in the usual manner regulate the supply through the pipe *m*. The pressure regulation can also be applied as desired to the pump-feeding tube *m*. This latter method would be adopted should fluid fuel be exclusively used, in which case the reservoir L would act as the pressure vessel of the pump. The fuel-supply apparatus might be placed directly on the reservoir L, as the motion of the gas therein would keep the dust in suspension. The hopper T might also contain fluid fuel.

The mixture of the fuel and gas may take place in the interior of the cylinder or a prolongation thereof, as shown in Fig. 4. In this case the reservoir L contains pure compressed air, and in addition to the nozzle D for pulverulent fuel I provide a nozzle *d* for liquid or gaseous fuel for the purpose of intensifying combustion. In this instance the nozzle *d* is arranged concentric with the nozzle D, the liquid or gaseous fuel being supplied to said nozzle *d* through the lateral pipe S′, while the air for combustion and the solid fuel are supplied to the nozzle D through the pipe S, leading from the reservoir.

The nozzles D and *d* instead of being arranged concentrically may be arranged side by side, as shown in Fig. 5, and caused to discharge into a common combustion-chamber J, forming a prolongation of the cylinder and separated from the bore proper of the same by a perforated partition *a*. The regulation may be rendered still more sensitive by changing the fixed point 2 of the diagram, for instance, to 2′ or $2^2$, Fig. 2, thus varying at the same time the height of the ordinate 0 2, 0′ 2′, $0^2$ $2^2$, &c., and the length 0 1, 0′ 1, $0^2$ 1, &c., as well as the expansion-curve 3 4, 3′ 4′, $3^2$ $4^2$, &c. This regulation is easily effected by opening the fuel-valve *n*, not when the piston is at the commencement of its return stroke, but somewhat later, in which case compression takes place from 1 to 2, Fig. 2, as before; but the compressed gas first expands on the return stroke from 2 to 2′ or 2 $2^2$, &c., before the commencement of the period of combustion 2′ 3′, $2^2$ $3^2$, &c.

Of course in practice the lines of the diagram are not so regular as shown, but about as indicated in dotted lines between 2′ and 3′, Fig. 2. It is also evident that the lead may be given to the fuel-valve *n* on the compression-stroke, whereby the upper end of the compression-line 2′ 2 is made steeper and the combustion-curve changed to $2^3$ $3^3$, taking under circumstances even a form like $2^3$ *m* $3^3$. This lead of the valve may be effected by changing the position of the cam actuating said valve, so that the fuel will be introduced somewhat in advance of the end of the compression-stroke of the piston and the valve kept open during part of the working stroke of the piston.

It is of particular importance that the fuel entering at the mouth should be thoroughly consumed and without the formation of soot. For this purpose all of the above-described devices for the admission of fuel may be provided within the cylinder with an additional burner similar in construction to those used for the same purpose for gas-burners—that is to say, the jet is not permitted to enter in solid cylindrical form, but is subdivided into thin sheets or jets. The construction may be similar to the Bunsen burner, which, as well known, gives a smokeless non-luminous flame. Such burners, located within the compression-space, are shown in Figs. 6, 7, 11, 12, and 13.

Fig. 6 shows a burner which subdivides the flame into a large number of very small tongue-shaped slow-burning jets. M' and $M^2$ show other forms of the same. The principle of the Bunsen burner is embodied in $M^4$ and $M^5$, the jet leaving the lower end while burning slowly and without discoloration. A similar effect is produced by the use of the twyer $M^3$.

The uniformity of diffusion of the heat throughout the whole mass of air in the compression-space is further increased by the peculiar arrangement of the burners—as, for instance, in Fig. 11, where owing to the lengthening of the twyer-pipe the burner is attached at E, so that while the piston is receding from I to II the greater part of the air is compelled to pass across the burner E. A second burner O may be provided.

Fig. 12 shows an arrangement for introducing the fuel laterally. The ribs R R on the left force the air on its way from the chamber to the cylinder and while expanding over the burners. The ribs R' R' to the right may be attached to the piston, so that the motion of the latter causes considerable agitation of the air. Finally, as shown in Fig. 13, the burner itself may be made movable for the purpose of obtaining more perfect distribution of heat. In this case the burner may be attached to the piston and the fuel supplied through a hollow piston-rod.

Figs. 6, 8, 9, and 10 show another way of carrying out the above-described method of regulation, the use of a special air-pump being dispensed with. In this instance the piston itself compresses the air necessary, not, however, in the usual way—by the momentum of the fly-wheel after cessation of combustion—but during the normal process of working without interrupting combustion and as an integral part of the working process itself.

In Figs. 6 and 8 the letter Y designates a valve, through which during the regular working a small quantity of compressed air escapes at the end of each compressing-stroke of the piston and passes by the tube *b*, Fig. 6, into the reservoir L. The air-pressure in the reservoir, therefore, equals the highest compression-pressure in the cylinder; but according to the previous description of the process an excess of pressure is required for the injection of the fuel. To obtain this result, the fuel-nozzle is not opened until the piston has slightly receded from the dead-point—that is to say, until the pressure in the cylinder has become somewhat lessened. As the opening of the nozzle by the governor occurs sooner or later, so the excess of pressure in the reservoir L varies. The injection of the fuel takes place, as previously described, S, Fig. 6, being the connecting-tube between the reservoir L and the nozzle, as in Fig. 3. The valve Y can also be arranged to be opened at the end of the stroke by the piston itself, or it might be a self-acting relief-valve, or for it might be substituted a cock or slide-valve.

Figs. 9 and 10 show the details of the gear for positively operating the valve Y. W is a cam-shaft provided with a number of cams I to V. Cam I operates the compressed-air valve Y in starting the engine. Cam II works valve Y in normal working. Cam III works the fuel-valve for nozzle D, and cam IV operates the main air inlet and exhaust valve V of the motor. This gear serves also in reverse order to start the motor, compressed air passing through valve Y from the reservoir L into the cylinder to drive the piston and then escapes through the valve V. During this very short starting period the lever H, Fig. 9, takes the dotted position H', where it is secured by a pin *h*, passing through the lever into a hole *h'* in the frame, so that the valve Y is moved by cam I instead of cam II, the valve V by cam IV instead of cam V, while the fuel-cam III is disengaged. After a few revolutions made in this manner the motor obtains its normal speed. At this moment the pin *h*, which retains the lever H in position, is removed. The lever is automatically pushed by spring F to the normal working position H, carrying with it the system of cams to continue the normal working without interruption. As the moving of the cams has to occur at the exact moment, it can only take place when a specially-arranged notch in the hub of the cams receives the detent *p*. (See Fig. 10.)

To adapt the engine to work on a two-stroke cycle in starting, the cam I, which operates the compressed-air valve Y at this time, is formed with two diametrically opposite protuberances, as shown in Fig. 8, so as to open the said valve at every half-revolution of the cam-shaft. For the normal operation with a four-stroke cycle the cam III is formed with a single protuberance, as shown in Fig. 9, so that the fuel-valve is opened only once in each revolution of the cam-shaft.

The valve Y (shown in Fig. 7) serves three purposes—first, to start the motor with compressed air; secondly, to fill the reservoir L during normal working, and, thirdly, to operate as a safety-valve, it being loaded by a spring *l*, so that on explosion in the cylinder the gases can pass to the reservoir L and thence through the safety-valve R.

To determine the maximum pressure in the cylinder, and consequently that in the reservoir L, a hand-wheel $H^2$ is applied, by means of which the spring *l* can be compressed more or less either while the engine is stopped or in motion.

It is evident that by adjusting the position of the cam III on the shaft W the time of opening of the fuel-supply valve can be varied—that is to say, by turning the cam either to the right or to the left on the cam-shaft the time of admission will be made earlier or later. It is also evident that by interchanging cams a different timing of admission can be obtained.

What I claim as new is—

1. In an internal-combustion engine, the combination of a cylinder and piston constructed and arranged to compress air to a degree producing a temperature above the igniting-point of the fuel, a supply for compressed air or gas; a fuel-supply; a distributing-valve for fuel, a passage from the air-supply to the cylinder in communication with the fuel-distributing valve, an inlet to the cylinder in communication with the air-supply and with the fuel-valve, and a cut-off, substantially as described.

2. In an internal-combustion engine, the combination of a cylinder and piston constructed and arranged to compress air to a degree producing a temperature above the igniting-point of the fuel; a distributing-valve for fuel; a cut-off for varying the time and duration of the supply of fuel, and a burner placed in the combustion-space and constructed for slow and perfect combustion of the gradually-introduced stream of fuel, substantially as shown and described.

3. In an internal-combustion engine, the combination of a cylinder and piston constructed and arranged to compress air to a degree producing a temperature above the igniting-point of the fuel, a supply for compressed air or gas, a hopper, a distributing-valve for pulverulent fuel, a passage from the air-supply to the cylinder in communication with the fuel-distributing valve, an inlet-valve to the cylinder in communication with the air-supply and with the valve for pulverulent fuel, and a cut-off for the fuel-supply, substantially as shown and described.

4. In an internal slow-combustion engine, the combination of a cylinder and piston constructed and arranged to compress air to a degree producing a temperature above the igniting-point of the fuel, a supply for compressed air, a hopper and distributing-valve for pulverulent fuel, a supply-pipe for liquid fuel, a valve or valves leading to the cylinder and communicating with the pulverulent-fuel-distributing valve and the liquid-fuel-supply pipe, and a cut-off for the fuel-supply, substantially as specified.

5. In an internal-combustion engine, the combination of a supply for compressed air, a feed for pulverulent fuel placed in communication with the air-supply and with the cylinder, and an auxiliary feed for liquid fuel communicating with the cylinder, substantially as specified.

6. In an internal-combustion engine, the combination of a cylinder and piston, a supply for compressed air, a distributing-valve communicating with the air-supply and with a fuel-supply for gradually introducing a unitary, or mixed fuel, into the combustion-space, a valve placed between the air-supply and the cylinder, and a reversing-gear in co-operation with said valve for starting the motor with the compressed air from the air-supply, substantially as described.

7. In an internal-combustion engine, the combination with a cylinder and a piston constructed to compress air to a degree producing a temperature above the igniting point of the fuel, of a fuel-feed, and a valve mechanism adapted to open the fuel-feed somewhat in advance of the end of the compression-stroke of the piston and to keep it open during part of the working stroke, substantially as and for the purpose specified.

8. In an internal-combustion engine, the combination of a cylinder and piston constructed to compress air or a mixture of air and neutral gas, a storage-reservoir in communication with the combustion-space of the cylinder, a valve controlling this communication and opening to admit compressed air from the cylinder to the reservoir, and a fuel-feed in communication with said reservoir for the introduction of fuel to the combustion-space under the pressure of the compressed air or gas in the reservoir, substantially as described.

9. In an internal-combustion engine, the combination of a cylinder and piston constructed and arranged to compress air to a degree producing a temperature above the igniting-point of the fuel, a distributing-valve for fuel, and a cut-off for varying the time and duration of the supply of fuel by said valve, substantially as described.

10. In an internal-combustion engine, the combination with the cylinder provided with fuel and air valve mechanism for operating same on a four-stroke cycle, and with means for supplying compressed air thereto, of valve mechanism controlling such compressed-air supply and means for operating said valve mechanism to enable the cylinder to work with compressed air on a two-stroke cycle.

11. In an internal-combustion engine, the combination with the combustion-cylinder provided with fuel, air admission and exhaust valves, means for supplying compressed air and a valve governing such compressed-air supply, of valve-operating mechanisms operated by the engine and adjustable to operate the fuel and exhaust valves on a four-stroke cycle or to operate the compressed-air and exhaust valves on a two-stroke cycle.

12. In an internal-combustion engine, the combination of a cylinder, a fuel-supply, a valve controlling the admission of fuel, means for supplying compressed air, including a valve, cam mechanism operated by said engine and means for placing said cam mechanism in operative relation with either the fuel-valve or the compressed-air valve.

13. In an internal-combustion engine, the combination of a cylinder; a fuel-supply; a valve controlling the admission of fuel; means for supplying compressed air, including a valve; cams of diverse peripheries formed respectively to impart a forward throw twice and once in each revolution and means for connecting at will the two-throw cam with the compressed-air valve or the one-throw cam with the fuel-supply valve.

In testimony that I claim the foregoing as my invention I have signed my name in presence of two witnesses.

RUDOLF DIESEL.

Witnesses:

FRANZ WALTER,

W. SEITZ.